(12) United States Patent
Day

(10) Patent No.: US 10,590,946 B2
(45) Date of Patent: Mar. 17, 2020

(54) TURBOCHARGER HAVING THRUST BEARING WITH BIASED OIL FLOW

(71) Applicant: BorgWarner Inc., Auburn Hills, MI (US)

(72) Inventor: Andrew Day, West (GB)

(73) Assignee: BorgWarner Inc., Auburn Hills, MI (US)

(*) Notice: Subject to any disclaimer, the term of this patent is extended or adjusted under 35 U.S.C. 154(b) by 263 days.

(21) Appl. No.: 15/401,154

(22) Filed: Jan. 9, 2017

(65) Prior Publication Data

US 2018/0195521 A1    Jul. 12, 2018

(51) Int. Cl.
| | |
|---|---|
| *F04D 29/051* | (2006.01) |
| *F04D 29/28* | (2006.01) |
| *F04D 29/053* | (2006.01) |
| *F01D 5/04* | (2006.01) |
| *F01D 25/16* | (2006.01) |

(Continued)

(52) U.S. Cl.
CPC .......... *F04D 29/0513* (2013.01); *F01D 5/04* (2013.01); *F01D 19/00* (2013.01); *F01D 25/164* (2013.01); *F01D 25/168* (2013.01); *F02B 33/40* (2013.01); *F02B 37/00* (2013.01); *F02C 6/12* (2013.01); *F02C 7/06* (2013.01); *F02C 7/26* (2013.01); *F04D 29/053* (2013.01); *F04D 29/284* (2013.01); *F16C 17/04* (2013.01); *F16C 33/108* (2013.01); *F16C 33/1085* (2013.01); *F05D 2220/40* (2013.01); *F05D 2240/52* (2013.01); *F05D 2240/60* (2013.01); *F16C 17/047* (2013.01); *F16C 2231/00* (2013.01); *F16C 2360/24* (2013.01); *Y02T 10/144* (2013.01)

(58) Field of Classification Search
CPC .. F04D 29/0513; F04D 29/053; F04D 29/284; F16C 33/1085; F16C 33/108; F16C 17/04; F16C 2231/00; F16C 2360/24; F16C 17/047; F02C 7/26; F02C 7/06; F02C 6/12; F01D 25/168; F01D 19/00; F01D 25/164; F01D 5/04; F02B 33/40; F02B 37/00; Y02T 10/144; F05D 2240/52; F05D 2240/60; F05D 2220/40
See application file for complete search history.

(56) References Cited

U.S. PATENT DOCUMENTS

| | | |
|---|---|---|
| 4,639,148 A | 1/1987 | Tamura et al. |
| 5,178,471 A | 1/1993 | Roessler et al. |

(Continued)

FOREIGN PATENT DOCUMENTS

| | | |
|---|---|---|
| DE | 102013224413 A1 | 5/2015 |
| DE | 102013224416 A1 | 5/2015 |

(Continued)

*Primary Examiner* — Jacob M Amick
*Assistant Examiner* — Charles Brauch
(74) *Attorney, Agent, or Firm* — Young Basile Hanlon & MacFarlane, P.C.

(57) ABSTRACT

A turbocharger includes a turbine wheel, a compressor wheel, a shaft coupled to the turbine wheel and the compressor wheel, and a thrust bearing. The thrust bearing includes a loaded side and an unloaded side. The loaded side bears a majority of axial loading caused by force imbalances between the turbine wheel and the compressor wheel during engine startup. The thrust bearing restricts oil flow to the unloaded side as compared to the loaded side during engine startup.

14 Claims, 4 Drawing Sheets

(51) Int. Cl.

| | | |
|---|---|---|
| *F01D 19/00* | (2006.01) | |
| *F02B 37/00* | (2006.01) | |
| *F02B 33/40* | (2006.01) | |
| *F02C 7/26* | (2006.01) | |
| *F02C 6/12* | (2006.01) | |
| *F16C 33/10* | (2006.01) | |
| *F16C 17/04* | (2006.01) | |
| *F02C 7/06* | (2006.01) | |

(56) References Cited

U.S. PATENT DOCUMENTS

| | | |
|---|---|---|
| 5,308,169 A | 5/1994 | Baker et al. |
| 5,558,446 A | 9/1996 | Kallenberger |
| 6,024,495 A | 2/2000 | Loos et al. |
| 6,036,435 A | 3/2000 | Oklejas |
| 6,669,372 B1 | 12/2003 | Martin |
| 7,401,980 B2 | 7/2008 | Krauss et al. |
| 7,762,724 B2 | 7/2010 | Yoshimura et al. |
| 8,240,921 B2 | 8/2012 | Boning et al. |
| 2014/0140865 A1 | 5/2014 | Uneura et al. |
| 2014/0219777 A1* | 8/2014 | Uneura ................. F01D 25/186 415/112 |

FOREIGN PATENT DOCUMENTS

| | | |
|---|---|---|
| EP | 2072764 B1 | 3/2016 |
| WO | 2014038080 A1 | 3/2014 |

* cited by examiner

TURBOCHARGER HAVING THRUST BEARING WITH BIASED OIL FLOW

CROSS-REFERENCE TO RELATED APPLICATION(S)

None.

TECHNICAL FIELD

This disclosure relates to turbochargers and, in particular, thrust bearings thereof and lubrication of thrust bearings.

BACKGROUND

In the field of internal combustion engines, turbochargers are forced-induction devices that are utilized to increase the pressure of the intake air provided to the engine. Exhaust gases from the engine are routed to the turbocharger and are utilized to drive a turbine wheel. The rotational force generated by the turbine wheel is utilized to drive a compressor wheel, which pressurizes ambient intake air and supplies the pressurized intake air to the engine. By pressurizing the intake air, the amount of air and fuel that can be forced into each cylinder during an intake stroke of the engine is increased. This produces an increased power output relative to a naturally-aspirated engine.

The turbine wheel and the compressor wheel are mounted to a common shaft. The shaft is loaded axially and bears against a thrust washer, which in turn bears axially against the thrust bearing. For example, during operation of the turbocharger, the thrust bearing is axially loaded by the shaft due to force imbalances between the turbine wheel and the compressor wheel (e.g., arising pressure imbalances and wheel geometry). During engine startup, such as during cold startup, this axial loading occurs primarily in one direction against a first side (e.g., axial face) of the thrust bearing, which may be considered a loaded side of the thrust bearing. For example, the axial loading during startup may be in a direction from the turbine wheel toward the compressor wheel, or may be directed from the compressor wheel toward the turbine wheel in some applications. A second side (e.g., axial face) of the thrust bearing that is opposite the first side is loaded to a lesser degree than the first side (e.g., is generally not loaded) during startup and may be considered an unloaded side of the thrust bearing; however, this second side may still experience axial loading thereagainst during engine startup and other operating conditions.

The interface between the thrust bearing and the thrust washer is lubricated by oil (e.g., engine oil). More particularly, the oil is pumped through the thrust bearing and exits loaded and unloaded sides of the thrust bearing (i.e., an axial face that receives the axial load, and an opposite axial face). The oil thereby forms a lubricating film between the loaded and unloaded sides of the thrust bearing and the thrust washer.

During normal engine operation, the oil is heated and, thereby, has a relatively low viscosity, which allows sufficient oil to flow between the loaded side of the thrust bearing and the thrust washer despite there being relatively small axial clearance between the loaded side of the thrust bearing and the thrust washer (e.g., approximately 10 microns in some applications) as compared to the larger axial clearance between the unloaded side of the thrust bearing and the thrust washer or other member (e.g., approximately 100 microns in some application). During engine startup (e.g., cold start), however, the oil may have a relatively low temperature and, thereby, high viscosity. The high viscosity of the oil and relatively small axial clearance between the loaded side of the bearing and the thrust washer restricts the oil from flowing between the loaded side and the thrust washer. Simultaneously, the relatively large axial clearance between the unloaded side and the thrust washer allows a relatively high proportion of the oil to flow between the unloaded side and the thrust washer. For example, during engine startup, oil flow may be distributed between the loaded side and the unloaded side of the thrust bearing at a ratio of 10% to 90%.

SUMMARY

One aspect of the disclosed embodiments is the turbocharger that includes a turbine wheel, a compressor wheel, a shaft coupled to the turbine wheel and the compressor wheel, and a thrust bearing. The thrust bearing includes a loaded side and an unloaded side. The loaded side bears a majority of axial loading caused by force imbalances between the turbine wheel and the compressor wheel during engine startup. The thrust bearing restricts oil flow to the unloaded side as compared to the loaded side during engine startup.

A thrust bearing for a turbocharger includes an oil inlet, a first axial side, and a second axial side. The first axial side includes one or more first outlets in fluidic communication with the oil inlet and have a first nominal flow rate therethrough. The second axial side includes one or more second outlets in fluidic communication with the oil inlet and have a second nominal flow rate therethrough that is less than the first nominal flow rate.

A turbocharger having a turbine wheel, a compressor wheel, a shaft extending between and rotatably coupling the turbine wheel to the compressor wheel, a housing through which the shaft extends, and a thrust plate fixedly coupled to the housing. The thrust plate is configured to receive axial loading from the shaft on a first side thereof during cold start. The thrust plate restricts oil flow through a second side thereof as compared to through the first side thereof during cold start.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a turbocharger that is configured to restrict oil flow to an unloaded side of a thrust bearing and, thereby, bias oil flow to a loaded side of the thrust bearing during engine startup (e.g., cold start).

Figure 1:
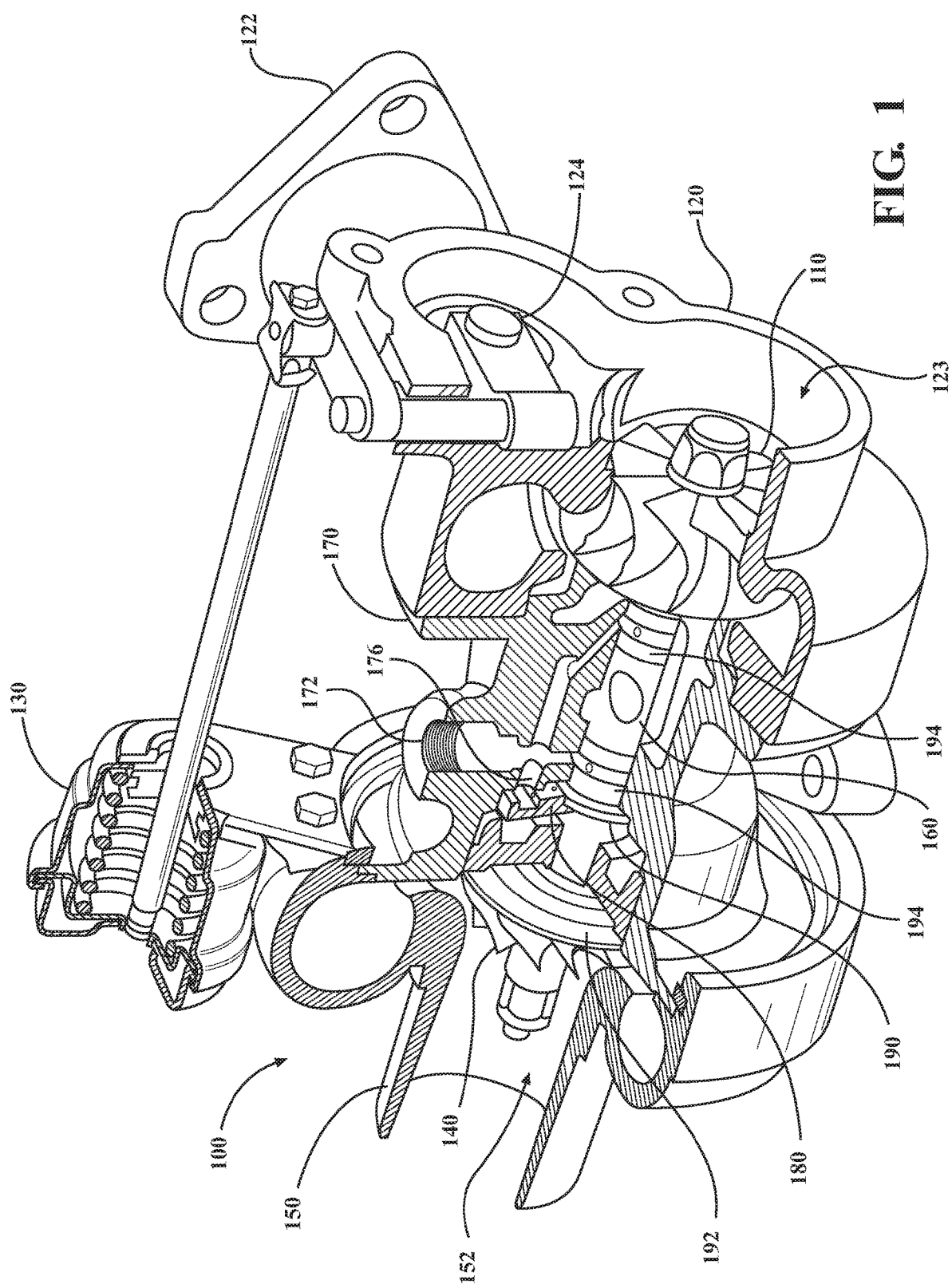
FIG. 1 is a front perspective partial cross-section illustration showing a turbocharger.

FIG. 1 shows a turbocharger 100. The turbocharger 100 is an exhaust-gas driven forced induction device that is utilized in conjunction with an internal combustion engine (not shown). The turbocharger 100 includes a turbine wheel 110. The turbine wheel 110 is located in a turbine housing 120. The turbine housing 120 includes an exhaust gas inlet 122 for receiving exhaust gas from the internal combustion engine, which turns or spins the turbine wheel 110. Exhaust gases are routed from the exhaust gas inlet 122 to the turbine wheel 110 before exiting the turbine housing 120 at an exhaust gas outlet 123. A wastegate 124 may be mounted in the turbine housing 120 to allow some or all of the exhaust gas to bypass the turbine wheel 110. The wastegate 124 is movable between an open position and a closed position by a control device 130.

The turbocharger 100 includes a compressor wheel 140. The compressor wheel 140 is located in a compressor housing 150. The compressor housing 150 includes an intake air inlet 152 and an intake air outlet (not shown). Intake air is routed from the intake air inlet 152 to the compressor wheel 140, where the intake air is pressurized by rotation of the compressor wheel 140. The intake air then exits the compressor housing 150 at the intake air outlet before being supplied to the internal combustion engine.

Rotation of the compressor wheel 140 is driven by rotation of the turbine wheel 110. In particular, the turbine wheel 110 and the compressor wheel 140 are each connected to a shaft 160. The shaft 160 can be a substantially rigid member, and each of the turbine wheel 110 and the compressor wheel 140 can be connected to the shaft 160 in a manner that prevents rotation of the turbine wheel 110 and the compressor wheel 140 with respect to the shaft 160. As a result, the compressor wheel 140 can rotate in unison with the turbine wheel 110 in response to rotation of the turbine wheel 110.

The shaft 160 is supported within a bearing housing 170 such that it is able to rotate freely with respect to the bearing housing 170 at a very high rotational speed. The bearing housing 170, the turbine housing 120, and the compressor housing 150 are all arranged along an axis of rotation of the shaft 160. In particular, the bearing housing 170 is positioned between the turbine housing 120 and the compressor housing 150, with a first end of the bearing housing 170 being connected to the turbine housing 120 and a second end of the bearing housing 170 being connected to the compressor housing 150.

The bearing housing 170 contains a portion of the shaft 160, a thrust bearing 180 (e.g., thrust plate), a thrust washer 190 (e.g., thrust ring, thrust collar, etc.) fixed axially on the shaft 160, and one or more journal bearings 194. The bearing housing 170 is closed by an oil seal plate 192 (e.g., cover, closure, etc.), which holds the thrust bearing 180 axially against an opposing axial face (not labeled; e.g., shoulder) of the bearing housing 170. The shaft 160, the thrust washer 190, the thrust bearing 180, and the oil seal plate 192 function to cooperatively transfer axial force from the turbine wheel 110 to the bearing housing 170 and, thereby, locate the shaft 160 axially relative to the bearing housing 170. As referenced above, the axial force is the result of a pressure imbalance between the turbine wheel 110 in the turbine housing 120 and the compressor wheel 140 in the compressor housing 150, which applies a net axial force from the shaft 160 to the thrust bearing 180. In typical applications (e.g., typical turbocharger designs), the axial force is in the axial direction moving from the turbine wheel 110 to the compressor wheel 140, but may be in an opposite direction in other configurations or usage conditions. The journal bearings 194 maintain the shaft 160 in a radial position within the bearing housing 170.

The bearing housing 170 is additionally configured to receive and drain oil (e.g., engine oil) therefrom. The bearing housing 170 includes an oil inlet 172 that receives the oil during operation of the engine (e.g., from an oil pump), and an oil outlet (not shown) from which the oil is drained. An oil conduit 176 receives oil from the oil inlet 172 and supplies oil to the thrust bearing 180 and to the journal bearings 194.

Referring to FIGS. 2-6, the thrust bearing 180 is a plate-like member that the thrust washer 190 bears against axially and rotates relative thereto. The thrust bearing 180 is additionally configured to distribute oil received from the oil inlet 172 for lubricating the interface between the thrust bearing 180 and the thrust washer 190. More particularly, and as discussed in further detail below, the thrust bearing 180 is configured to bias oil flow during engine startup (e.g., cold start) to a loaded side 182 (e.g., first or loaded surface, axial face, or side) of the thrust bearing 180 and/or restrict oil flow to an unloaded side 282 (e.g., second or unloaded surface, axial face, or side) thereof. As referenced above, during engine startup, axial loading of the thrust bearing 180 occurs primarily (e.g., in a majority of time and/or magnitude) in one direction against one side (e.g., the first or loaded side 182) of the thrust bearing 180, though axial loading may still occur in an opposite direction against another side (e.g., the second or unloaded side 282). As used herein, the term "loaded side," or similar, refers to that side (e.g., the first side 182) of the thrust bearing 180 that receives such a majority of the axial loading (e.g., is primarily loaded) during startup, while the term "unloaded side," or similar, refers to the other side (e.g., the second side 282) of the thrust bearing 180 (e.g., that which does not receive the majority of the axial loading during startup). The term "startup" or "engine startup" refers to starting of an engine (e.g., an internal combustion engine) that the turbocharger 100 works in conjunction with. Engine startup includes cold start conditions in which oil supplied for lubricating the turbocharger 100 is at lower than a normal (e.g., prescribed, desired, etc.) operating temperature and, thereby, may have higher viscosity than in normal operating temperature. Engine startup may also include warm start condition in which the oil supplied for lubricating the turbocharger 100 is at normal operating temperature.

The thrust bearing 180 includes the loaded side 182 and the unloaded side 282, which are axial surfaces against which the thrust washer 190 (e.g., radially extending flanges thereof) bear axially. The loaded side 182 forms an axial surface against which the thrust washer 190 primarily bears axially during startup and rotates relative thereto. More particularly, one of the radially extending flanges (not labeled) of the thrust washer 190 slides against the loaded side 182 of the thrust bearing 180 in a radially inward region 180a (e.g., bearing region, portion, or segment) of the thrust bearing 180. An opposite radially extending flange (not shown) of the thrust washer 190 may at times also bear against the unloaded side 282 of the thrust bearing 180 in the radially inward region 180a.

Generally speaking, those reference numerals in the 100's refer to elements/features of or associated with the loaded side 182 of the thrust bearing 180, while reference numerals in the 200's refer to elements/features of or associated with the unloaded side 282 of the thrust bearing 180. Additionally, the loaded side 182 may be arranged to face the turbine wheel 110 (as shown) or the compressor wheel 140 depending on the expected direction of primary loading during engine startup.

The thrust bearing 180 additionally includes pads 184 (e.g., bearing pads, ramps, lands, wedges, protrusions, etc.), which provide axially raised surfaces against which the thrust washer 190 bears (e.g., with an intervening oil layer therebetween). The pads 184 are arranged in the radially inward region 180a on the first or loaded side 182 of the thrust bearing 180. The pads 184 are protrusions that extend axially away from surrounding surfaces 185 of the thrust bearing 180.

The pads 184 form a ramped surface that is angled toward the turbine wheel 110 moving from a leading edge 184a to a trailing edge 184b (e.g., circumferentially in a direction of rotation of the thrust washer 190 and shaft 160). For example, the surrounding surfaces 185 may form a plane that is perpendicular to the axis of rotation of the shaft 160, while the leading edge 184a is closer to the surrounding surface 185, and the trailing edge 184b is further therefrom.

Figure 2:
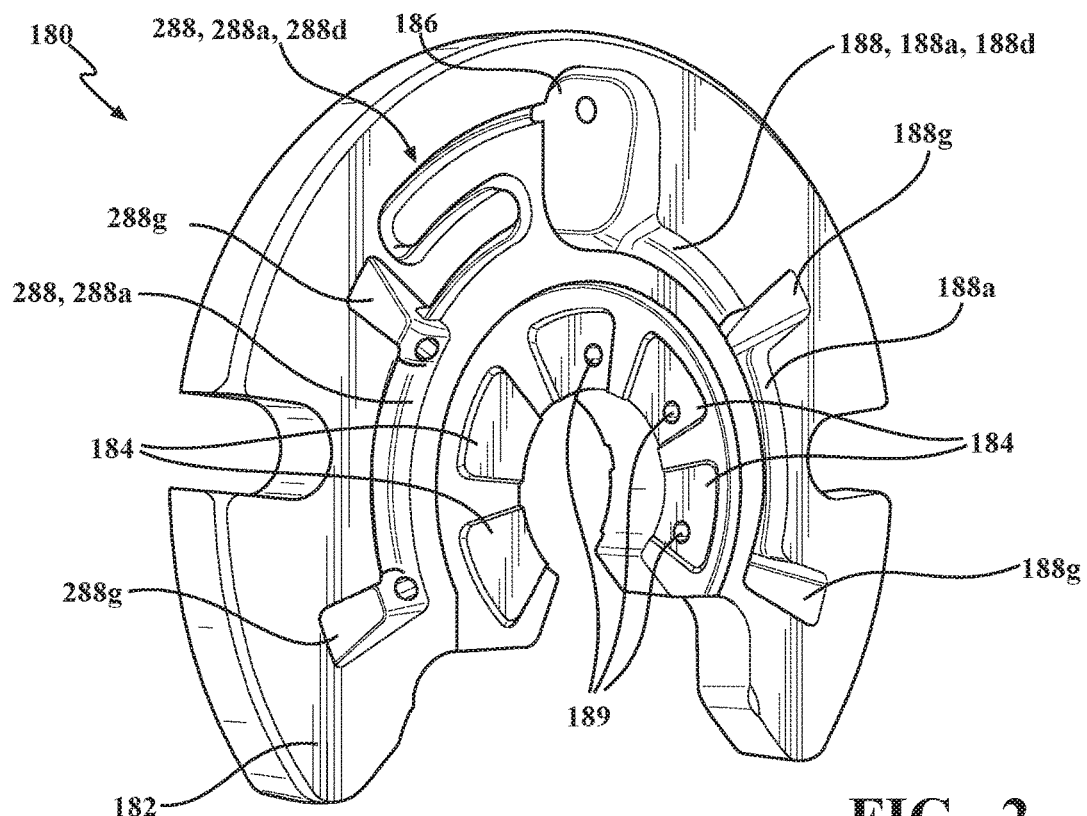
FIG. 2 is a front perspective view of a thrust bearing of the turbocharger shown in FIG. 1.
Figure 3:
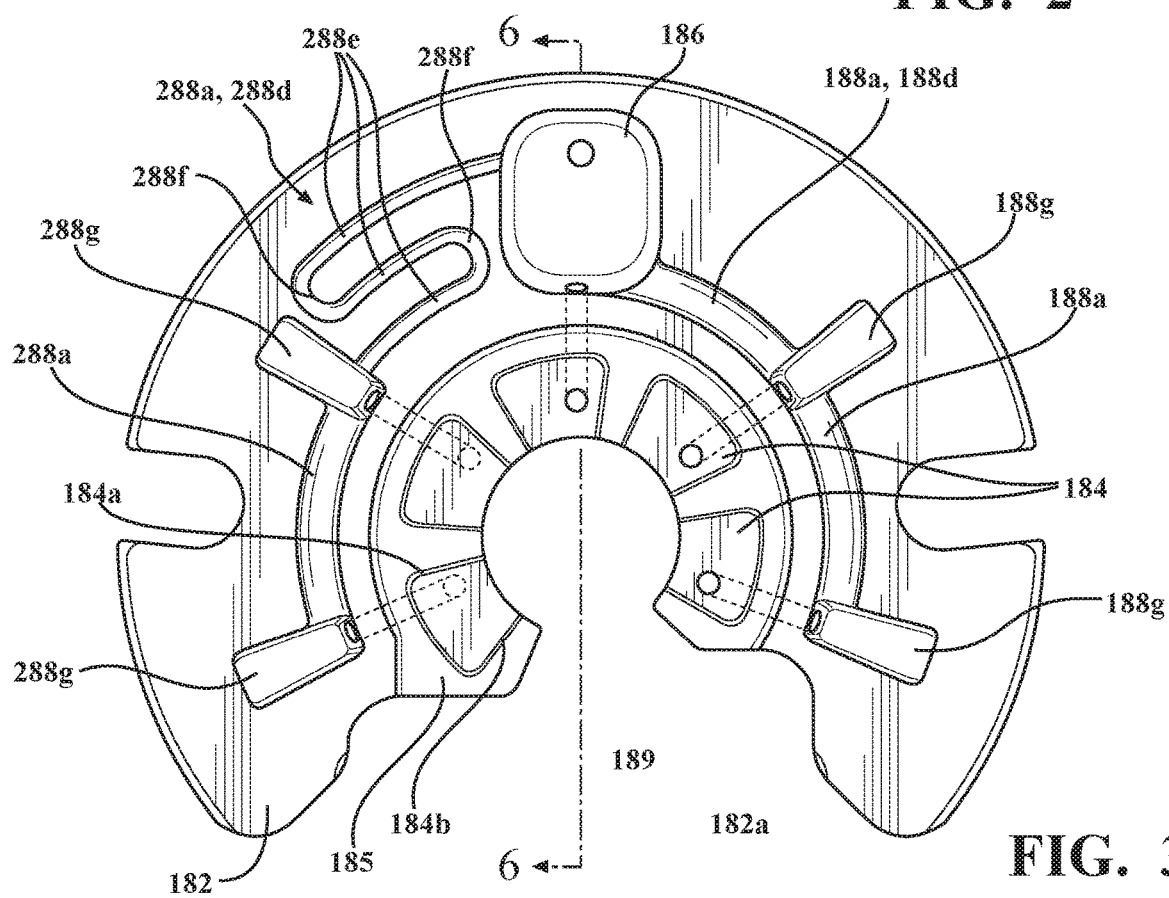
FIG. 3 is a front view of the thrust bearing shown in FIG. 2.
Figure 4:
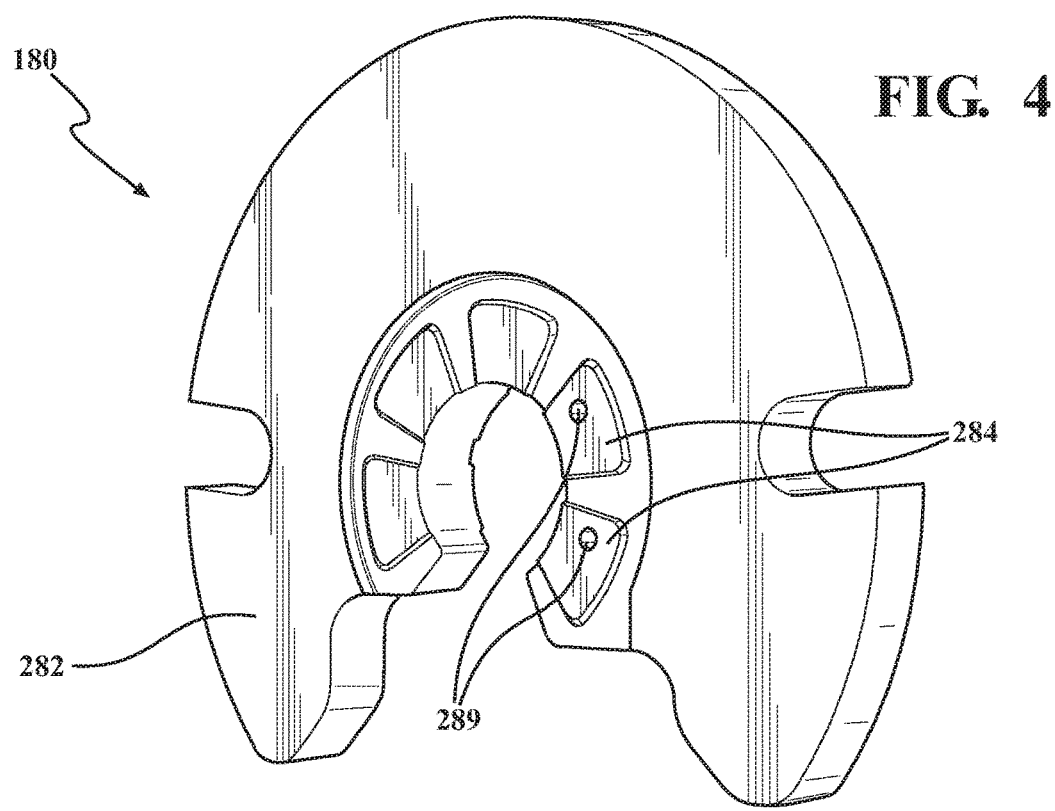
FIG. 4 is rear perspective view of the thrust bearing shown in FIG. 2.
Figure 5:
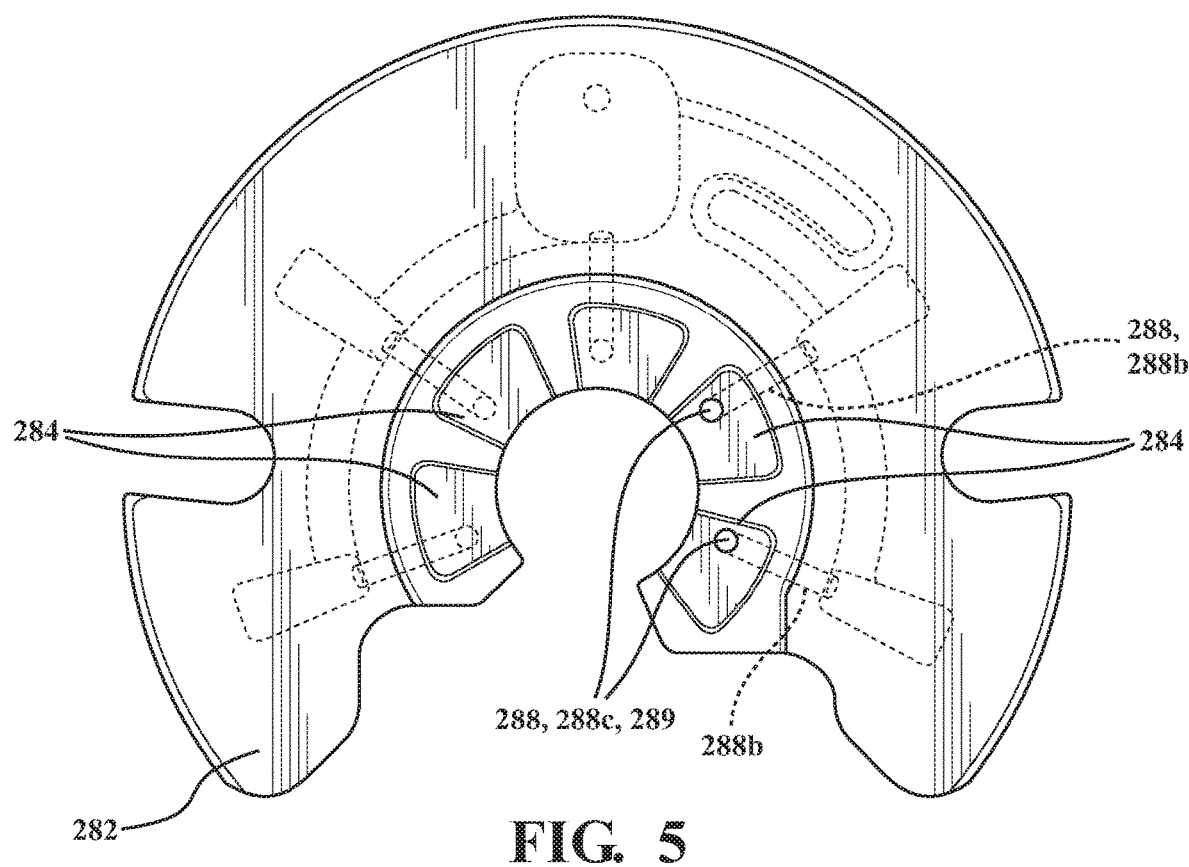
FIG. 5 is a rear view of the thrust bearing shown in FIG. 2.
Figure 6:
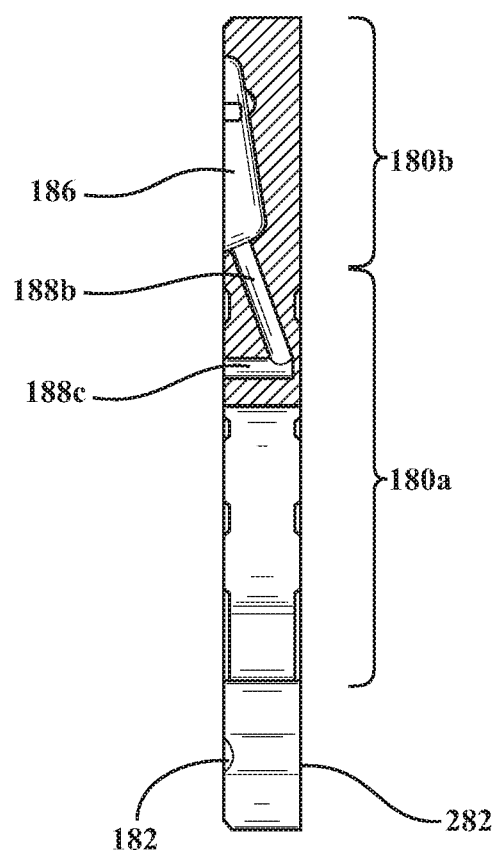
FIG. 6 is a cross-sectional view of the thrust bearing taken along line 6-6 in FIG. 3.

As shown in FIGS. 2-3, the thrust bearing 180 includes five of the pads 184 (e.g., loaded side pads 184) on the loaded side 182. As shown in FIGS. 4-5, the thrust bearing 180 additionally includes five pads 284 (e.g., unloaded side pads 284), similarly configured to the pads 184, on the unloaded side 282. The pads 284 on the unloaded side 282 may be located at common circumferential locations as the pads 184 on the loaded side 182 (as shown). According to other embodiments, the thrust bearing 180 may include fewer (e.g., zero to four) or more pads 184, 284 (e.g., six or more) on the loaded side 182 and/or the unloaded side 282 of the thrust bearing 180.

As referenced above, the thrust bearing 180 is additionally configured to distribute (e.g., feed, direct, route, etc.) oil to the loaded side 182 and the unloaded side 282 thereof. The thrust bearing 180 includes an inlet 186 (e.g., oil input, receptacle, ports, etc.), a plurality of channels 188, 288 (e.g., distribution, routing, or fluid channels or conduits, etc.), and a plurality of outlets 189, 289 (e.g., outputs, apertures, holes, ports, etc.). The inlet 186 is configured to receive oil from the oil conduit 176 of the bearing housing 170. The plurality of channels 188, 288 distribute oil from the inlet 186 to the outlets 189, 289. The outlets 189, 289 release oil (e.g., oil exits therethrough) to the loaded side 182 and the unloaded side 282, respectively, of the thrust bearing 180. It should be noted that reference numerals of the channels 188, 288 (i.e., 188 and 288), respectively, may refer to any one of or a combination of the various sections, subsections, or channels (e.g., 188a, 188b, 188c, 188d and 288a, 288b, 288c, 288d, 288e, 288f) discussed in further detail below.

The inlet 186 of the thrust bearing 180 is, for example, a recess formed in the loaded side 182 of the thrust bearing 180 in a radially outer region 180b of the thrust bearing 180. The inlet 186 is aligned with the oil conduit 176 of the bearing housing 170. With the thrust bearing 180 being positioned against a shoulder region of the bearing housing 170 (as referenced above), surfaces (e.g., planar surfaces) of the loaded side 182 that surround the inlet 186 of the thrust bearing 180 are engaged with the opposing surfaces (e.g., planar surfaces) of the bearing housing 170 that surround the oil conduit 176, so as to form a sealed relationship therebetween. While the inlet 186 is depicted as being arranged on the loaded side 182 of the thrust bearing 180, the inlet 186 may instead be arranged on the unloaded side 282 (e.g., but still facing the turbine wheel 110 in arrangements in which the axial loading is directed from the compressor wheel 140 to the turbine wheel 110).

The outlets 189, 289 of the thrust bearing 180 are openings that each release oil through one of the loaded side 182 or the unloaded side 282, respectively, of the thrust bearing 180. The outlets 189, 289 are arranged in the radially inward region 180a of the thrust bearing 180 and are radially overlapped by one of the radially-extending flanges of the thrust washer 190. Each of the outlets 189, 289 is proximate the leading edge 184a of one or more of the pads 184, 284 (e.g., being formed within the pads 184, 284, respectively, closer to the leading edge 184a than the trailing edge 184b). For example, three outlets 189 (e.g., loaded side outlets 189) are associated with three of the loaded side pads 184 on the loaded side 182 of the thrust bearing 180, and two outlets 289 (e.g., unloaded side outlets 289) are associated with two of the unloaded side pads 284 on the unloaded side 282 of the thrust bearing 180. The loaded side outlets 189 supply the oil to be axially between the pads 184 and the thrust washer 190 (e.g., forming a film or ramp of oil therebetween). The unloaded side outlets 289 supply the oil to be axially between the pads 284 and the opposing flange of the thrust washer 190 or other member. The outlets 189, 289 may, however, be provided in other suitable numbers (e.g., more or fewer) as may be appropriate for a given application.

The channels 188, 288 of the thrust bearing 180 are configured to distribute oil from the inlet 186 to the outlets 189, 289, respectively. The channels 188, 288 generally include circumferential channels 188a, 288a (e.g., outer channels), radial channels 188b, 288b (e.g., interior channels or conduits), and axial channels 188c, 288c (e.g., inner channels or conduits).

The circumferential channels 188a, 288a, in part, function as manifolds by which oil is supplied to the radial channels 188b, 288b. The circumferential channels 188a, 288a are grooves or recesses in the loaded side 182 of the thrust bearing 180 in the radially outer region 180b. The circumferential channels 188a (e.g., loaded side circumferential channels 188a) and the circumferential channels 288a (e.g., unloaded side circumferential channels 288a, which are also formed in the loaded side 182) extend generally in opposite circumferential directions (e.g., about a central axis of the thrust bearing 180) from the inlet 186. The circumferential channels 188a are configured to distribute oil to the loaded side outlets 189, while the circumferential channels 288a are configured to distribute oil to the unloaded side outlets 289. As shown in FIGS. 2-3, one or more of the loaded side outlets 189 may be in direct communication with the inlet 186 (i.e., via the radial channel 188b and the axial channel 188c independent of the circumferential channel 188a).

Similar to the inlet 186, surfaces (e.g., planar surfaces) of the loaded side 182 that surround the circumferential channels 188a, 288a of the thrust bearing 180 are engaged with the opposing surfaces (e.g., planar surfaces) of the bearing housing 170 that surround the oil conduit 176 (e.g., cooperatively forming closed/sealed channels or conduits). The circumferential channels 188a, 288a may, for example, be cast and/or machined into the loaded side 182 of the thrust bearing 180. In other embodiments, the circumferential channels 188a, 288a may be formed in other manners, for example, by following a different profile (e.g., linear, non-concentric, etc.), be closed in a different manner (e.g., by facing another plate member instead of the bearing housing 170), etc. For example, the unloaded side circumferential channel 288a may form a restricting feature as discussed in further detail below.

The radial channels 188b, 288b and the axial channels 188c, 288c are configured to communicate oil from the circumferential channels 188*a*, 288*a* to the outlets 189, 289. More specifically, the radial channels 188*b* (e.g., loaded side radial channels 188*b*) and the axial channels 188*c* (e.g., loaded side axial channels 188*c*) communicate oil from the loaded side circumferential channel 188*a* to the loaded side outlets 189. As referenced above, one or more of the radial channels may communicate directly from the inlet 186. The radial channels 288*b* (e.g., unloaded side radial channels 288*b*) and the axial channels 288*c* (e.g., unloaded side axial channels 288*c*) communicate oil from the unloaded side circumferential channel 288*a* to the unloaded side outlets 289.

The radial channels 188*b*, 288*b* are closed conduits (as opposed to recesses) that are positioned entirely between the loaded side 182 and the unloaded side 282 of the thrust bearing 180. The radial channels 188*b*, 288*b* are straight and extend radially inward from the circumferential channels 188*a*, 288*a* (i.e., toward the central axis of the thrust bearing 180) and axially toward the unloaded side 282. The radial channels 188*b*, 288*b* may originate at recesses 188*g*, 288*g* (e.g., pockets) in the radially outer region 180*b* of the thrust bearing. The recesses 188*g*, 288*g* may facilitate machining (e.g., drilling, boring, etc.) of the radial channels 188*b*, 288*b*.

The axial channels 188*c*, 288*c* are closed conduits that extend axially from radially inward ends of the radial channels 188*b*, 288*b* to the outlets 189, 289, respectively, associated therewith. More particularly, the loaded side axial channels 188*c* extend from the loaded side radial channels 188*b* in an axial direction (e.g., parallel with the axis of the thrust bearing 180) to the loaded side 182 of the thrust bearing 180. The unloaded side axial channels 288*c* extend from the unloaded side radial channels 288*b* in an opposite axial direction (e.g., also parallel with the axis of the thrust bearing 180) to the unloaded side 282 of the thrust bearing 180. The axial channels 188*c*, 288*c* may be formed by a machining operation (e.g., drilling, boring, etc.) that also forms the outlets 189, 289.

As referenced above, the thrust bearing 180 is configured to bias oil flow to the loaded side 182 of the thrust bearing 180 (i.e., to the loaded side outlets 189) and/or restrict oil flow to the unloaded side 282 thereof (i.e., through the unloaded side outlets 289) during cold start conditions. More particularly, the thrust bearing 180 includes one or more restricting features (e.g., balance features) that function to provide greater flow resistance (e.g., first or unloaded side internal flow resistance) through the unloaded side channels 288 and the unloaded side outlets 289, as compared to another flow resistance (e.g., second or loaded side internal flow resistance) through the loaded side channels 188 and the loaded side outlets 289. This greater unloaded side internal flow resistance offsets still further external flow resistance (e.g., loaded side or net external flow resistance) caused by the close axial clearance between the loaded side 182 of the thrust bearing 180 and the thrust washer 190 (e.g., axial spacing with the radially extending flange of the thrust washer 190) during cold start conditions. As a result, more oil flow is provided to the loaded side 182 of the thrust bearing 180 during cold start than if the loaded side 182 and the unloaded side 282 had equal internal flow resistance.

The restricting features may instead or additionally be considered to provide nominal oil flow (i.e., without external resistance caused by unequal axial clearance) through the thrust bearing 180, which is biased to the loaded side 182 of the thrust plate 180 as compared to the unloaded side 282. The unloaded side outlets 289, thereby, have a nominal flow rate (e.g., a cumulative flow rate) that is less than that of the loaded side outlets 189.

One restricting feature includes an inlet channel 288*d* that is elongated (e.g., convoluted, tortuous, or serpentine channel, conduit, path, section, inlet portion, etc.). The inlet channel 288*d*, by being elongated, increases friction, and thereby, internal flow resistance between the inlet 186 and the unloaded side outlets 289, as compared to between the inlet 186 and the loaded side outlets 189 during startup conditions, including cold start conditions when the oil has relatively high viscosity. The inlet channel 288*d* may, instead of or in addition to being elongated, have a smaller cross-sectional size than the circumferential channel 188*a* of the loaded side 182 leading to one or more of the loaded side outlets 189. By being elongated and/or having a small cross-sectional size, the inlet channel 288*d* may be considered a restricting feature (e.g., a flow restricting channel).

The inlet channel 288*d* extends from the inlet 186, and is arranged fluidically between the inlet 186 and the unloaded side outlets 289. The inlet channel 288*d* forms an elongated path to the unloaded side outlets 289. The inlet channel 288*d* may be considered elongated in various manners, for example, by following an indirect (e.g., convoluted) path from the inlet 186 to the loaded side outlets 289 (e.g., a non-concentric path to the recess 288*g* associated with a nearest of the loaded side outlets 289 to the inlet 186), having a length that is significantly greater than cross-sectional dimensions thereof, and/or by forming relatively long fluid paths from the inlet 186 to the unloaded side outlets 289 as compared to fluid paths to the loaded side outlets 189.

The inlet channel 288*d* may be elongated by having a serpentine shape. The inlet channel 288*d* includes three circumferential subsections 288*e* that are each of approximately equal length (e.g., approximately ⅔ or more) to the inlet portion 188*d* (e.g., inlet channel) of the loaded side circumferential channel 188*a*. The three circumferential subsections 288*e* are generally concentric with the axis of the thrust bearing 180. The inlet channel 288*d* also includes two reversing sections 288*f* (e.g., approximately 180-degree bends) that connect the three circumferential subsections 288*e* to each other in a serial manner. While the three circumferential subsections 288*e* of the inlet channel 288*d* are shown as being arranged at different radial positions and extending concentrically with the two reversing sections 288*f* therebetween, the inlet channel 288*d* may be configured in other manners (e.g., having more sections and bends, having sections that are not curved, are not concentric with the axis of the thrust bearing 180, and/or extend radially, etc.). The inlet channel 288*d* may be elongated in still further manners.

The inlet channel 288*d* may, instead or additionally, be elongated by having a relatively small cross-sectional size as compared to its length. For example, the inlet channel 288*d* may have a length that is significantly greater than a width and/or a depth thereof (e.g., 10 times or greater, 20 times or greater, or 30 times or greater). In contrast, the inlet portion 188*d* of the circumferential channel 188*a* of the loaded side 182 may have a length that is approximately five times greater than a width and/or depth thereof.

The inlet channel 288*d* may, instead or additionally, be elongated by forming a longer fluid path from the inlet 186 to the unloaded side outlets 289 than to the loaded side outlets 189. In various examples, the inlet channel 288*d* may contribute to forming a longer fluid path from the inlet 186 to a nearest one of the unloaded side outlets 289, a furthest one of the unloaded side outlets 289, and/or all of the unloaded side outlets 289, as compared respectively to a nearest one of the loaded side outlets 189, a furthest one of the loaded side outlets 289, and all of the loaded side outlets 189. In a first example, the inlet channel 288d forms a longer fluid path from the inlet 186 to a closest (e.g., nearest or first) one of the unloaded side outlets 289 (or to a closest or first one of the unloaded side radial channels 288b) than a fluid path from the inlet 186 to a closest (e.g., nearest or first) one of the loaded side outlets 189c (or to a closest or first one of the loaded side radial channels 188b). As shown in the figures, the fluid path from the inlet 186 to the nearest unloaded side outlet 289 (i.e., the uppermost unloaded side outlet 289) extends from the inlet 186, through the inlet channel 288d, and through the radial channel 288b to the unloaded side outlet 289. In contrast, the fluid path from the inlet 186 to the nearest loaded outlet 289 (i.e., the uppermost loaded side outlet 189) extends directly from the inlet 186 through the radial channel 188b to the loaded side outlet 189. Thus, the path to the nearest unloaded side outlet 289 from the inlet 186 is longer by approximately the length of the inlet channel 288d than the path to the nearest loaded side outlet 189.

Instead or additionally, the inlet channel 288d may form a longer fluid path from the inlet 186 to a furthest one of the unloaded side outlets 289 (or the unloaded side radial channel 288b associated therewith) than to a furthest one of the loaded side outlets 189 (or the loaded side radial channel 188b associated therewith). As shown in the figures, the fluid path from the inlet 186 to the furthest unloaded side outlet 289 (i.e., the lowermost unloaded side outlet 289) extends from the inlet 186, through the inlet channel 288d, through the circumferential channel 288a, and finally through the radial channel 288b to the unloaded side outlet 289. In contrast, the fluid path from the inlet 186 to the furthest loaded side outlet 189 (i.e., the lowermost loaded side outlet 189) extends from the inlet 186, through the inlet portion 188d of the circumferential channel 188a, through the remainder of the circumferential channel 188a, and finally through the radial channel 188b to the outlet 189. Thus, the path to the furthest unloaded side outlet 289 from the inlet 186 is longer by approximately the difference between the lengths of the inlet channel 288d and the inlet portion 188d of the circumferential channel 188a.

Instead or additionally, the fluid path from the inlet 186 to the first one of the unloaded side outlets 289 (or the first unloaded side radial channel 288b) may be longer than the fluid path to each one (i.e., all) of the loaded side outlets 189 and/or the loaded side radial channels 188b, including those in communication directly with the inlet 186 and those in communication with the loaded side circumferential channel 188a. For example, as compared to an inlet portion 188d of the loaded side circumferential channel 188a, which is arranged fluidically between the inlet 186 and one or more of the loaded side outlets 189, the inlet channel 288d is longer (e.g., approximately two times longer or more) and includes a plurality of bends (e.g., three two bends).

During normal operating conditions when the oil is at operating temperature and less viscous, the elongation of the inlet channel 288d may add relatively little (e.g., negligible) friction and resultant internal flow resistance to the unloaded side 282 as compared to the loaded side 182. Additionally, during normal operating conditions, the small axial clearance to the loaded side 182 (e.g., between the loaded side pads 184 or outlets 189 and the flange of the thrust washer 190) may add little (e.g., negligible) external flow resistance to the loaded side 182 as compared to the unloaded side 282.

As a result, during normal operating conditions, the relative flow rates between the unloaded side 282 and the loaded side 182 become governed primarily by a minimum net cross-sectional flow area of the channels 188 and the loaded side outlets 189 as compared to a minimum net cross-sectional area of the channels 288 and the unloaded site outlets 289. The minimum cross-sectional flow area of each of the unloaded side 282 and the loaded side 182 is the smallest net (e.g., most restrictive) cross-sectional area of any single serial flow path or multiple parallel flow paths through which oil flows through the unloaded side 282 or the loaded side 182, respectively.

In one example, a minimum cross-sectional area of the inlet channel 288d may be approximately equal to or greater than a cumulative cross-sectional area of the unloaded side outlets 289, such that the cumulative cross-sectional area of the unloaded side outlets 289 governs the flow rate therethrough to the loaded side outlets 189. Similarly, a minimum cross-sectional area of the loaded side circumferential channel 188a may be approximately equal to or greater than a minimum cumulative cross-sectional area of the loaded side outlets 189 in communication therewith, such that the cumulative cross-sectional area of the loaded side outlets 189 governs the flow rate therethrough relative to the unloaded side outlet 289. It should additionally be noted that because the outlets 189, 289 are fed by the inlet 186 (i.e., one common inlet), the oil flowing through the outlets 189, 289 is at generally the same pressure.

The cross-sectional flow areas of the loaded side 182 and the unloaded side 282 may also be configured relative to each other to form another restricting feature. More particularly, the unloaded side 282 is configured to have a lesser minimum cross-sectional flow area than the loaded side 182.

In one example, the unloaded side outlets 289 have a lower (e.g., lesser) cumulative cross-sectional area (e.g., outlet area) than the loaded side outlets 189, which results in a lower nominal flow rate through the unloaded side outlets 289 as compared to the loaded side outlets 189. For example, the loaded side outlets 189 may be the same size but greater in number than the unloaded side outlets 289 (as shown), or may be larger in size but the same or fewer in number than the unloaded side outlets 289, to achieve a cumulative greater cross-sectional area. For example, the outlet area of the unloaded side outlets 289 may be approximately two-thirds or less than that of the loaded side outlets 189.

Instead or additionally, the unloaded side circumferential channel 288a (e.g., the inlet channel 288d or portion thereof) may have a smaller minimum cross-sectional area (e.g., size) than the loaded side circumferential channel 188a. The respective minimum cross-sectional areas of the unloaded side circumferential channel 288a and the loaded side circumferential channel 188a are arranged fluidically between the inlet 186 and the unloaded side outlets 289 and the loaded side outlets 189, respectively (e.g., between the inlet 186 and all such outlets 189, 289, respectively). Because unloaded side circumferential channel 288a and the loaded side circumferential channel 188a have the same oil pressure at their respective inlets (i.e., the pressure of the inlet 186), relative flow rate is governed by the relative cross-sectional areas of the channels, such that the smaller minimum cross-sectional area of the unloaded side circumferential channel 288a results in the unloaded side circumferential channel 288a having lower nominal flow rate than the loaded side circumferential channel 188a.

The minimum cross-sectional area of the unloaded side circumferential channel 288a (e.g., the inlet channel 288d thereof) may correspond to (e.g., be substantially equal to) the cumulative cross-sectional area of the unloaded side outlets 289. As such, the minimum cross-sectional area of the unloaded side circumferential channel 288a does not restrict flow to a greater extent than the unloaded side outlets 289 themselves. Alternatively, the minimum cross-sectional area of the unloaded side circumferential channel 288a may be less (i.e., thereby providing greater internal flow resistance) or more (i.e., thereby providing negligible additional internal flow resistance) than the cumulative cross-sectional area of the unloaded side outlets 289.

As referenced above, the thrust bearing 180 may include one or more (e.g., one, two, or all three) of the flow restricting features described above. For example, as shown in the figures, the thrust bearing 180 includes the three restricting features of the unloaded side circumferential channel 288a having the inlet channel 288d that is elongated, the inlet channel 288d having the smaller cross-sectional area than the inlet portion 188d of the loaded side circumferential channel 188a, and the unloaded side outlets 289 having the lesser cumulative cross-sectional area than the loaded side outlets 189 (i.e., by having fewer unloaded side outlets 289 of the same size as the loaded side outlets 189).

It is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A turbocharger comprising:
a turbine wheel, a compressor wheel, and a shaft coupled to the turbine wheel and the compressor wheel; and
a thrust bearing having a loaded side and an unloaded side, the loaded side bearing a majority of axial loading caused by force imbalances between the turbine wheel and the compressor wheel during engine startup, wherein the thrust bearing restricts oil flow to the unloaded side as compared to the loaded side during engine startup wherein the thrust bearing includes an oil inlet, one or more loaded side outlets, a loaded side circumferential channel configured to distribute oil from the oil inlet to the loaded side outlets, one or more unloaded side outlets, and an unloaded side circumferential channel configured to distribute oil from the oil inlet to the unloaded side outlets, wherein the unloaded side circumferential channel is a flow restricting channel.

2. The turbocharger according to claim 1, wherein the unloaded side circumferential channel is at least one of elongated or smaller in cross-sectional size as compared to the loaded side circumferential channel.

3. The turbocharger according to claim 2, wherein the unloaded side circumferential channel is elongated in a serpentine manner.

4. The turbocharger according to claim 2, wherein the unloaded side circumferential channel is smaller in cross-sectional size as compared to the loaded side circumferential channel.

5. The turbocharger according to claim 1, wherein the thrust bearing includes an unloaded side outer channel that distributes oil to the unloaded side, wherein the unloaded side outer channel includes a serpentine section.

6. The turbocharger according to claim 5, wherein the thrust bearing includes a loaded side outer channel that distributes oil to the loaded side, and the loaded side outer channel does not include a serpentine section.

7. The turbocharger according to claim 5, wherein the thrust bearing includes an oil inlet, one or more unloaded side outlets on the unloaded side, and one or more loaded side outlets on the loaded side, wherein the serpentine section forms part of a fluid path from the oil inlet to a closest one of the unloaded side outlets, which is longer than another fluid path from the oil inlet to a closest one of the loaded side outlets.

8. The turbocharger according to claim 7, wherein the serpentine section forms a third fluid path from the oil inlet to a furthest one of the unloaded side outlets, which is longer than a fourth fluid path from the oil inlet to a furthest one of the loaded side outlets.

9. The turbocharger according to claim 1, wherein the unloaded side has a minimum cross-sectional flow area that is less than that of the loaded side.

10. The turbocharger according to claim 9, wherein the minimum cross-sectional flow area of the unloaded side is formed by one of a cross-sectional area of an inlet channel or a cumulative cross-sectional area of unloaded side outlets of the unloaded side.

11. The turbocharger according to claim 10, wherein the minimum cross-sectional flow area of the loaded side is formed by the cumulative cross-sectional area of loaded side outlets of the loaded side.

12. The turbocharger according to claim 1, wherein the thrust bearing includes an oil inlet configured to receive oil, a loaded side outer channel through which the oil flows to one or more loaded side outlets of the thrust bearing, and an unloaded side outer channel through which oil flows to one or more unloaded side outlets of the thrust bearing, wherein the unloaded side outer channel has a smaller minimum cross-sectional area than another minimum cross-sectional area of the loaded side outer channel.

13. The turbocharger according to claim 1, wherein the thrust bearing includes one or more loaded side outlets that release oil through the loaded side thereof, and one or more unloaded side outlets that release oil through the unloaded side thereof, wherein the unloaded side outlets have a cumulative outlet area that is less than another cumulative outlet area of the loaded side outlets.

14. The turbocharger according to claim 1, wherein the thrust bearing has lesser axial clearance with the loaded side than the unloaded side that causes an external flow resistance that resists oil flow from the loaded side; and
wherein the thrust bearing includes a restricting channel that restricts the oil flow to the unloaded side for offsetting the external flow resistance.

* * * * *